Patented Aug. 5, 1952

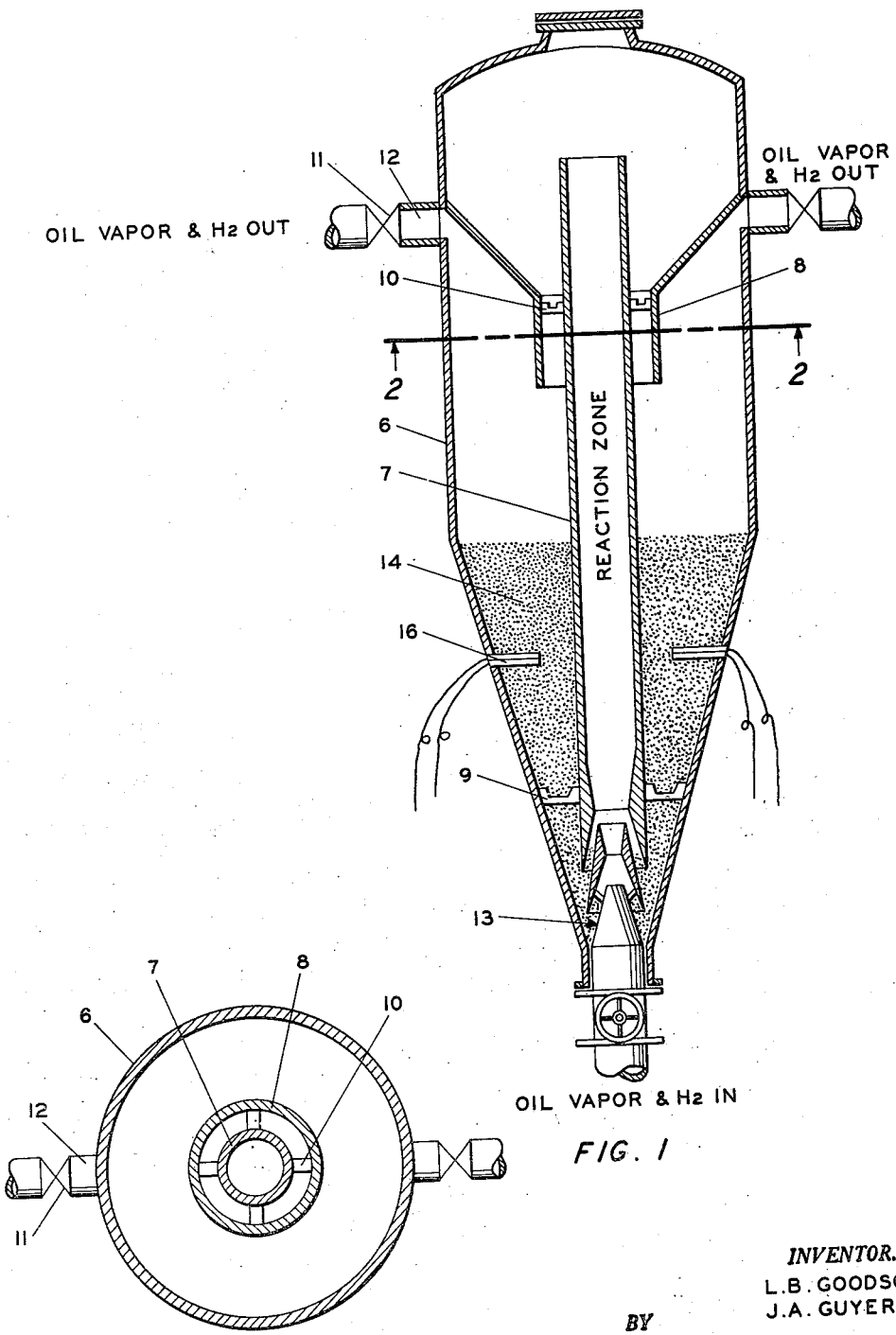

2,606,097

UNITED STATES PATENT OFFICE 2,606,097

FLUID TYPE CATALYTIC REACTION CHAMBER AND METHOD OF OPERATING SAME

Luke B. Goodson and Jesse A. Guyer, Bartlesville, Okla., assignors to Phillips Petroleum Company, a corporation of Delaware Application August 25, 1947, Serial No. 770,498

7 Claims. (Cl. 23—1)

This invention relates to the vapor phase reaction of various hydrocarbon materials in the presence of catalyst materials. In one of its more specific aspects it relates to an improved catalytic reaction chamber utilizing finely divided solid catalyst material, and to the operation of such a chamber. In another of its more specific aspects it relates to a method and apparatus for hydrogenating hydrocarbons.

When reacting hydrocarbon materials in the presence of a fixed bed granular catalyst, it has been found that a portion of the catalyst bed tends to lose its activity rather rapidly and such inactivity progressively consumes the entire catalyst bed. We have found that considerably better catalytic effect may be accomplished by using finely divided solid catalyst material in a fluid type reaction chamber. Contact surface of the finely divided catalyst material is considerably greater than that of the granular type catalyst material. A considerable saving in the life of a catalyst material is accomplished by using the finely divided solid catalyst in a fluid type reactor. Substantially all portions of the finely divided catalyst materials receive the same amount of contact with the reactant materials and no one portion is substantially unused, to the detriment of the other portions.

In reaction chambers of this type which have been utilized heretofore, it has been necessary to use rather expensive and complicated mechanisms to accomplish the separation of the catalyst particles from the vapors. Examples of such complicated means are cyclone separators, Cottrell electric precipitators, and the like. The present invention resides in accomplishing catalytic reactions by means of close association of vaprous hydrocarbons with finely divided solid catalyst materials, separating the catalyst material from such vapors simply and economically, and recycling said catalyst materials with additional reactant materials.

An object of this invention is to provide means whereby finely divided solid catalyst material and gases or vapors may be intimately contacted together in the reaction of such gases or vapors.

Another object of the invention is to provide means whereby after contacting finely divided catalyst materials with a stream of vapors or gases the catalyst may be easily separated therefrom and recycled with additional gases or vapors.

Still another object is to provide an apparatus for carrying out catalytic reactions, utilizing finely divided catalyst material, at low or at high pressure.

Yet another object is to provide a method for carrying out catalytic reactions, utilizing finely divided catalyst material, at low or at high pressure.

A further object of the invention is to provide a process for carrying out catalytic reactions, using finely divided solid catalyst material, with the greatest possible economy.

A still further object of the invention is to provide an apparatus for carrying out catalytic reactions, using finely divided solid catalyst material, with the greatest possible economy.

Other objects and advantages of the invention will be apparent to those skilled in the art from the accompanying description, the drawing, and the appended claims.

Figure 1 of the drawing is a cross section elevational view of a device disclosing the preferred embodiment of our invention.

Figure 2 is a cross section horizontal view taken along line 2—2 of Figure 1.

In Figure 1 the apparatus of our invention as diagrammatically shown has an outer shell 6, the bottom portion of which shell has a progressively smaller cross sectional area. An inner tubular member 7 is provided, within said outer shell, and extends coaxially within said shell from a point within the lower extremities of the chamber formed by the outer shell to a point in the upper portion of the same chamber. Constriction means, such as upturned funnel shaped member 8, is provided in the upper portion of outer shell 6 and is positioned so that its outer periphery, at the upper end, forms a gastight seal with the outer shell while the member portion having the smallest cross sectional area extends coaxially about and is spaced from inner tubular member 7. The cross sectional area of the opening between the smallest portion of the constriction means and the tubular member should preferably be substantially that of the inner tubular member. The area may, however, vary therefrom for the only requirement is that it be sufficiently small to cause vapors to pass through it at a relatively high velocity. Inner tubular member 7 may be supported within outer shell 6 by any conventional means, such as bracket members 9, attached to the wall of the lower portion of shell 6, and bracket members 10, secured to funnel-shaped member 8. Outer shell 6 is provided with vapor outlets 12, in its walls, at a point below the gastight seal with funnel shaped member 8 but above the level of the bottom of said funnel shaped member. These vapor outlets are preferably positioned at a point adjacent the gastight seal between the outer shell and the funnel member. Vapor outlets 12 may have flow control means 11 positioned therein to control flow therethrough. Shell 6 is further provided in its lower extremities with injector means, such as Venturi type fluid injector means 13, which injector means extends through the bottom of the outer shell and into the bottom portion of inner tubular member 7. This injector means may comprise a nozzle and an intermediate member, providing a space for flow, upwardly between them, from the chamber. The lower portion of the inner tubular member may also be shaped to from a part of the injector means. The bottom portion of the chamber formed between outer shell 6 and inner tubular member 7 is filled with a body of finely divided solid catalyst material 14. Temperature indicating devices such as thermocouple members 16 are provided in the walls of outer shell 6 and extend into the body of finely divided solid catalyst material 14.

Finely divided solid catalyst material 14 may be any suitable, finely divided material which will give the desired catalytic effect. In general, as examples of such materials, we may use powdered form fuller's earth and other natural clays, acid refined clays, synthetic clays, or co-precipitated gels, any of which may of itself be sufficiently catalytic to produce the desired reaction or which may act as a support or carrier and be impregnated with some other material which will give the desired catalytic reaction. The finely divided catalyst material should preferably be within a range of between about 60 and about 180 mesh, though the size of the catalyst particles may be increased or decreased beyond these limits as desired, depending on their flotation properties and the velocity of gas flow. It is preferable to have the particles of catalyst of substantially the same size in order that there will be a substantially even flow of the catalyst material in the vapor stream. In that manner, the tendency for a portion of the catalyst material to settle out of a more finely divided catalyst material will be substantially eliminated.

In the operation of the device of our invention as diagrammatically shown in Figure 1, preheated gaseous or vaporized reaction materials are injected through an injection zone, formed by the injection means extending through the bottom of the reaction chamber. The flow of these vapors through the injector means draws finely divided catalyst material from the bottom of the chamber outside the injector means and the inner tubular member. The admixture of catalyst material in the vapors is forced upwardly through the inner tubular member 7 and out of the top of the inner tubular member into an enlarged chamber section or upper settling zone, formed above the constriction means or funnel-shaped member. The reaction zone comprises the space defined by tubular member 7 and this latter enlarged settling zone. In this enlarged chamber the velocity of the flow of the vapors and catalyst material is sufficiently reduced that a portion of the catalyst material settles from the vapors and accumulates on the funnel-shaped member. The vapors and catalyst material are then forced through a constricted zone formed between the constriction member and the outside of the inner tubular member 7. The velocity of flow of the vapor-catalyst admixture passing through this constriction zone is substantially increased. The flow of such admixture from the first settling zone also carries the accumulated, settled catalyst with it at a relatively high speed. The vapor and catalyst admixture, on leaving the constriction zone, once again enters a chamber having a large cross sectional area which forms a lower or second enlarged settling zone. In this zone the velocity of the vapors once again is diminished. The vapors pass upwardly in the lower settling zone and are removed from such zone through the vapor outlets in the upper portion of that zone. The operation of the lower settling zone is such that substantially all of the remaining catalyst in the vapor catalyst admixture is removed therefrom. The velocity of flow of the vapors entering the lower settling zone is substantially reduced and at the same time the stream of vapors changes direction, moving upwardly to the vapor outlets. The particles of catalyst material are thrown from the vapors by their own inertia. The catalyst, thus removed from the vapor and catalyst admixture, is collected in the bottom of the second settling zone and is recycled with additional reactant material.

In many of the catalytic reactions carried on with this type reaction chamber, as in destructive or non-destructive hydrogenation, the reactions are exothermic and heat will tend to accumulate within the reaction chamber. This difficulty is overcome by placing thermocouple means in the lower portion of the reaction chamber, within the body of catalyst material therein, and controlling the preheat temperature for the reactant materials in accordance with the temperature of the catalyst. In this manner we prevent the catalyst material from being burned in exothermic reactions. On the other hand when endothermic reactions, such as catalytic cracking, are carried on, the preheat means may be controlled in accordance with the temperature determined by the thermocouple means and thus a sufficient amount of heat will be furnished to maintain the necessary conversion temperature within the chamber to assure good reaction results.

When the activity of the catalyst material decreases sufficiently to require regeneration the feed of reactant material may be cut off and regeneration gases, such as heated air, together with a diluent, may be injected through the injector means and upwardly through the reaction zone, and will carry portions of the finely divided catalyst material with it. The process of regeneration of the catalyst material is carried on in the same manner as the reaction of reactant materials. The catalyst is separated from the regeneration gases in the same manner as it is separated from the effluent of the reaction step.

*Example*

A petroleum fraction boiling in the kerosene range is hydrogenated using the type reaction chamber described above. The petroleum fraction, at the rate of two barrels per hour, together with hydrogen, at the rate of 2,000 standard cubic feet per barrel of hydrocarbon, is vaporized in a preheating chamber and charged to the reaction chamber through the injector means. The finely divided catalyst (100–140 mesh) which is placed in the lower settling zone prior to the start is drawn into the reaction zone through the Venturi type injector. The system pressure is approximately 500 lbs. per square inch. Under these conditions, the apparent linear velocity in the reaction zone, which has a cross sectional area equivalent to 0.023 square foot, is 4.4 feet per second. The apparent linear velocity in the settling zone, which has a cross sectional area equivalent to 0.51 square foot, is 0.2 foot per second. When using a catalyst 100–140 mesh and a particle density of approximately 4.0 grams per cubic centimeter, it is found that with apparent linear velocity up to approximately 2.5 feet per second, very little of the catalyst is carried out of the reaction zone. At velocities greater than 6 feet per second, all of the catalyst is carried out of the reaction zone into the settling zone. Between 2.5 and 6.0 feet per second, the amount of catalyst carried out varies with the vapor velocity. In this range, the reaction zone resembles a boiling liquid in that some particles are settling and others are rising. The amount of catalyst drawn into the reaction zone by means of the Venturi or jet arrangement in the bottom depends on the velocity of vapor flow and the design of the jet.

While the above example relates to hydrogenation it is not intended to limit the invention to such a catalytic process. The application of the invention to such processes as catalytic cracking, reforming, Fischer-Tropsch, and others, is obvious. The invention will apply to any catalytic process or non-catalytic process wherein a vapor or gas and finely divided solid catalyst are contacted and separated after being contacted.

It is obvious that by a suitable mechanical design of the reaction chamber, the invention may be used at either high or low pressures. For a high pressure design, only the external walls of a vessel need to be designed for high pressure. All internal construction may be of standard weight materials.

This invention is not to be considered as limited by the foregoing illustrative details but only by the terms and spirit of the appended claims.

We claim:

1. A fluid-type reaction chamber comprising in combination, an outer shell; an inner tubular member open at each end and extending coaxially within said outer shell from a point within the lower extremity of the chamber formed by said shell to a point in the upper portion of said chamber; a fluid injector in said shell protruding upwardly into said tubular member; a constrictor within the upper portion of said shell, connected at its upper end to the periphery of said shell by a gas-tight seal, extending inwardly and downwardly from said shell so as to form an annular opening between its lower end portion and said tubular member in the upper portion of said chamber; vapor outlets in said outer shell communicating between said chamber and the exterior of said shell at a level below the level of the upper end of said constriction means but above the level of the bottom of said constriction means; and passage means formed between said injector and said inner tubular member so as to communicate between said chamber and said inner tubular member.

2. A fluid type reaction chamber comprising in combination, an outer shell, the bottom portion of which has a progressively smaller cross sectional area; an inner tubular member which is open at each end and extends coaxially within said outer shell from a point within the lower extremities of the chamber formed by said shell to a point in the upper portion of said chamber; fluid injector means in the bottom of said shell and protruding upwardly into said tubular member; constriction means comprising an upturned funnel-shaped member in the upper portion of said outer shell, the upper portion of which member forms a gas-tight seal at the outer periphery of its upper end with said outer shell, and the lower portion of which is spaced from and extends coaxially about a portion of said tubular member; vapor outlets in said outer shell communicating between said chamber and the exterior of said shell at a level below said gas-tight seal but above the level of the bottom of said funnel shaped member; and passage means communicating between said injector means and said lower extremities of said chamber.

3. The reaction chamber of claim 2, wherein said vapor outlet means have flow control means therein to control the flow of vapors therethrough.

4. A fluid type reaction chamber comprising in combination, an outer shell, the bottom portion of which has a progressively smaller cross sectional area; an inner tubular member which is open at each end and extends coaxially within said outer shell from a point within the lower extremities of the chamber formed by said shell to a point in the upper portion of said chamber; Venturi-type fluid injector means in the bottom of said shell and protruding upwardly into said tubular member; constriction means comprising an upturned funnel shaped member in the upper portion of said outer shell, the upper portion of which member forms a gas-tight seal at the outer periphery of its upper end with said outer shell and the lower portion of which is spaced from and extends coaxially about a portion of said tubular member; vapor outlets in said outer shell communicating between said chamber and the exterior of said shell at a level below said gas-tight seal but above the level of the bottom of said funnel shaped member; a passageway communicating through said venturi between the interior of said chamber and the interior of said injector means; and thermocouple means extending into the lower portion of said chamber.

5. An improved method for operating a single catalytic reaction chamber which comprises in combination, the steps of injecting a feed of preheated vaporous reaction materials upwardly through an injection zone in said chamber; drawing finely divided solid catalyst material through said injection zone by and into admixture with said vaporous reaction material; passing said admixture upwardly through a reaction zone and into a first settling zone within said chamber, wherein a portion of the catalyst is allowed to settle from the vapors; passing said admixture downwardly in indirect heat exchange with said central reaction zone and through a constriction zone within said chamber and into a second settling zone within said chamber; separating vaporous materials from said finely divided catalyst; removing said vaporous materials from the upper portion of said second settling zone and said chamber and collecting said catalyst in the bottom of said zone; recycling said catalyst with additional reaction materials, and periodically substituting regeneration gases for said reaction materials feed to regenerate said catalyst material within said chamber.

6. An improved method for operating a single catalytic reaction chamber which comprises in combination the steps of injecting a feed of preheated vaporous reaction materials upwardly through an injection zone in said chamber; drawing finely divided solid catalyst material through said injection zone by and into admixture with said vaporous reaction materials; passing said admixture upwardly through a central reaction zone and into a first enlarged settling zone within said chamber, wherein the velocity of flow of such admixture is decreased and a portion of said catalyst settles from said admixture; passing said admixture and said separated catalyst downwardly in indirect heat exchange with said central reaction zone and through a constriction zone within said chamber at an increased velocity and into a second enlarged settling zone within said chamber; passing vaporous materials upwardly in said second settling zone, whereby catalyst materials are caused to separate therefrom by their own inertia; removing said vaporous materials from the upper portion of said second settling zone and said chamber; collecting said catalyst in the bottom of said second settling zone; recycling said catalyst material with additional reaction materials; and periodically substituting regeneration gases for said reaction materials to regenerate said catalyst material within said chamber.

7. An improved method for operating a single catalytic reaction chamber which comprises in combination the steps of injecting a feed of preheated vaporous reaction materials upwardly through an injection zone in said chamber; drawing finely divided solid catalyst material through said injection zone by and into admixture with said vaporous reaction materials; passing said admixture upwardly through a central reaction zone and into a first enlarged settling zone within said chamber, wherein the velocity of flow of such admixture is decreased and a portion of said catalyst settles from said admixture; passing said admixture and said separated catalyst downwardly in indirect heat exchange with said central reaction zone and through a constriction zone within said chamber at an increased velocity and into a second enlarged settling zone within said chamber; passing vaporous materials upwardly in said second settling zone, whereby catalyst materials are caused to separate therefrom by their own inertia; removing said vaporous materials from the upper portion of said second settling zone and said chamber; collecting said catalyst in the bottom of said second settling zone; regulating the temperature of the feed for said reaction chamber in accordance with the temperature of said catalyst in the bottom of said second settling zone; recycling said catalyst material with additional reaction materials, and periodically substituting regeneration gases for said reaction materials to regenerate said catalyst material within said chamber.

LUKE B. GOODSON.
JESSE A. GUYER.

REFERENCES CITED

The following references are of record in the file of this patent:

UNITED STATES PATENTS

| Number | Name | Date |
| --- | --- | --- |
| 1,188,768 | Hermansen | June 27, 1916 |
| 1,699,441 | Negro | Jan. 15, 1929 |
| 2,290,845 | Voorhees | July 21, 1942 |
| 2,367,351 | Hemminger | Jan. 16, 1945 |
| 2,383,636 | Wurth | Aug. 28, 1945 |
| 2,419,097 | Stratford et al. | Apr. 15, 1947 |
| 2,481,089 | Dickinson | Sept. 6, 1949 |

FOREIGN PATENTS

| Number | Country | Date |
| --- | --- | --- |
| 285,038 | Great Britain | May 9, 1929 |